2,945,822
REACTIVATION OF SOLID PHOSPHORIC ACID CATALYST

Lawrence N. Jacob, Toledo, Ohio, assignor to Sun Oil Company, Philadelphia, Pa., a corporation of New Jersey No Drawing. Filed Dec. 6, 1957, Ser. No. 700,963

5 Claims. (Cl. 252—414)

This invention relates to the reactivation of solid phosphoric acid catalyst which has become deactivated by nitrogen compounds during the polymerization of normally gaseous olefins.

It is known in the art to employ solid phosphoric acid catalyst in the polymerization of normally gaseous olefins, e.g. propylene, in order to obtain polymers generally ranging from the dimer to the pentamer. Solid phosphoric acid catalyst, as the term is used in this art, refers to a solid porous granular material, e.g. kieselguhr, silica gel, etc., which has been impregnated with an acid or phosphorus, e.g. phosphoric acid, and calcined to produce a desired lower state of hydration of the catalyst. The nature and preparation of the solid phosphoric acid catalyst are well known in the polymerization art, and numerous prior disclosures set forth these features of such catalyst.

The usual practice in polymerization of olefins by means of solid phosphoric acid catalyst involves passing the olefin charge material through a bed of the catalyst at a temperature usually within the approximate range from 300° F. to 500° F. and pressure within the approximate range from 500 p.s.i.g. to 2000 p.s.i.g. During the polymerization process, the catalyst gradually becomes deactivated as a result of contamination of the catalyst by nitrogen compounds contained in the charge stock. The manner in which the nitrogen compounds become associated with the phosphoric acid catalyst is not definitely known. The association may involve reaction of the nitrogen compounds with phosphoric acid to form reaction products which are retained in the catalyst. In any event, the nitrogen compounds become strongly enough associated with the catalyst that they are resistant to removal from the catalyst under conditions normally involved in the polymerization.

According to the present invention, a novel manner is provided for treating solid phosphoric acid catalyst to remove the nitrogen compounds which have contaminated the catalyst as a result of the contact with the polymerization charge stock. This is accomplished by contacting the solid phosphoric acid catalyst with a fatty acid or anhydride containing 1 to 3 carbon atoms per molecule. The contacting is performed in liquid phase at a temperature generally within the approximate range from room temperature to the boiling point of the acid employed. Generally, the temperature will be within the approximate range from 50° C. to 150° C. Elevated temperatures favor more nearly complete removal of basic nitrogen. Elevated pressure can be employed if desired in the contacting with fatty acid, although it is generally preferable to operate at atmospheric pressure. The fatty acid is preferably employed in the anhydrous state, although it is within the scope of the invention to employ an aqueous solution of the fatty acid or fatty acid containing a small amount of water.

It has been found that contacting with fatty acid is capable of bringing about removal of the bulk of basic nitrogen compounds from the used solid phosphoric acid catalyst. Since these nitrogen compounds have a detrimental effect on the activity of the catalyst, their removal according to the invention is a beneficial result.

Contacting solid phosphoric acid catalyst with lower fatty acid generally results in substantially complete removal of free phosphoric acid, defined as that phosphoric acid which is removable from the catalyst by water at room temperature, as well as of nitrogen compounds. Lower fatty acid contacting at room temperature does not remove any substantial amount of combined phosphoric acid, defined as that which is removable by water at its boiling point but not at room temperature, but does provide good removal of nitrogen compounds, which water is incapable of doing. Typically, a solid phosphoric acid catalyst may contain about 12 weight percent of free phosphoric acid and about 20 weight percent of combined phosphoric acid.

In one embodiment, the contacting with fatty acid according to the invention is performed in the presence of added phosphoric acid in order to inhibit the removal of free phosphoric acid together with nitrogen compounds by the fatty acid. Thus, a solution of phosphoric acid in either anhydrous or aqueous fatty acid can be employed as the treating agent. Alternatively, the contacting can be performed in the absence of added phosphoric acid, and the phosphoric acid which is removed thereby from the catalyst can be replaced by a subsequent treatment of the catalyst with aqueous phosphoric acid or other suitable impregnant. In either embodiment, a conventional calcining can be performed subsequent to the contacting with phosphoric acid.

The effluent from the catalyst treatment according to the invention usually contains fatty acid, nitrogen compounds, phosphoric acid and tarry material or polymer which was deposited on the catalyst during the polymerization and removed by the fatty acid. The latter is capable of removing a large proportion, e.g. 60% or more, of the tar and polymer, even at room temperature. More complete removal of tar and polymer can if desired be obtained by prior or subsequent treatment with acetone or some other solvent for such materials.

The fatty acid is preferably distilled from the effluent from the catalyst treatment and re-used to contact additional catalyst. The distilled fatty acid can if desired be used to treat additional solid phosphoric acid containing nitrogenous contaminants. The residual phosphoric acid can be separated from tar and polymer by selectively dissolving the acid in water and separating solution from undissolved material; it can then if desired be used to impregnate solid adsorbent, which may be either fresh adsorbent or that previously treated according to the invention; the impregnated adsorbent is calcined in conventional manner, and used as a polymerization catalyst.

In one embodiment, the contacting with fatty acid is performed in the presence of an aromatic hydrocarbon, preferably having not more than 15 carbon atoms, e.g. benzene, xylenes, naphthalene, methyl naphthalene, methyl isopropyl benzenes, etc., and this contacting is followed by a contacting with a treating agent consisting essentially of fatty acid. The first contacting removes substantially all the free phosphoric acid from the catalyst while removing only a minor amount of the basic nitrogen compounds. The acid and hydrocarbon are stripped off, and the phosphoric acid used to impregnate solid adsorbent. The second contacting removes the bulk of the nitrogen compounds but substantially no phosphorus compounds from the original adsorbent, leaving it in suitable condition for impregnation with additional phosphoric acid, which may be either fresh phosphoric acid or that which was removed in the first contacting. Generally similar results are obtained, employing aliphatic hydrocarbons, preferably those having 5 to 15 carbon atoms, e.g. pentane, petroleum naphtha, polymer gasoline produced in the polymerization of propylene or other olefin, etc., in place of the aromatic hydrocarbons. Hydrocarbons generally, including cycloaliphatic hydrocarbons, such as cyclohexane, methyl cyclohexane, etc., can be employed in this embodiment.

The contacting with fatty acid according to the invention can be performed in the presence of any suitable added solvent or diluent, such as acetone or other lower aliphatic ketone (up to 6 carbon atoms), methanol or other lower alkanol (up to 6 carbon atoms), carbon tetrachloride, diethyl ether, chlorinated hydrocarbons, fluorinated hydrocarbons, or those referred to previously, etc. Where mixtures are employed, it is preferred that each component be present in at least 10 volume percent, more preferably 25%, concentration based on total mixture.

The following examples illustrate the invention:

Example I

Solid phosphoric acid is employed in the polymerization of propylene at about 400° F. and about 1000 p.s.i.g. for a period of 50 days. The solid phosphoric acid catalyst is prepared by contacting granular kieselguhr with aqueous phosphoric acid, and calcining the resulting material at a temperature of about 600° F. At the conclusion of the polymerization period, the catalyst contains 1.11% basic nitrogen, as determined by the Kjeldahl technique. The used catalyst containing 1.11% basic nitrogen is contacted for 15 minutes with glacial acetic acid at the boiling point of the acetic acid. The amount of acetic acid employed is 20 ml. per gram of catalyst. At the end of the contacting period, the glacial acetic acid is separated from the catalyst and analyzed for basic nitrogen content. The acetic acid contains 1.07% basic nitrogen based on catalyst. Thus, nearly complete removal of basic nitrogen from the catalyst is obtained.

Example II

Operation generally similar to that in Example I is carried out on another solid phosphoric acid used previously in propylene polymerization, the contacting with acetic acid being at room temperature however and for a period of about 16 hours. The original deactivated catalyst contains about 0.36% basic nitrogen and about 12.4% free phosphoric acid. About 80% of this basic nitrogen, a major amount of the tar and polymer on the catalyst, and all of the free phosphoric acid are removed. Acetic acid is distilled from the resulting liquid phase and re-used to contact additional catalyst for removal of nitrogen compounds. Phosphoric acid in the residue is taken up in water and the solution is separated from tar and polymer and used to contact the previously treated catalyst and deposit phosphoric acid therein. The catalyst is then calcined at about 600° F. and re-used in polymerization of propylene.

Example III

Operation generally similar to that in Example II is carried out, using however an equal volume mixture of glacial acetic acid and acetone in place of acetic acid. About 67% of the basic nitrogen, all of the free phosphoric acid, and a greater proportion of tar and polymer than in Example II are removed from the catalyst.

Example IV

Operation generally similar to that in Example II is carried out, using however an equal volume mixture of glacial acetic acid and benzene in place of acetic acid. All of the phosphoric acid, but only about 22% of the basic nitrogen compounds, are removed from the catalyst. In a subsequent treatment of the catalyst with glacial acetic acid in the manner described in Example II, the bulk of the remaining basic nitrogen compounds are removed from the catalyst. Acetic acid and benzene are distilled from the first effluent, and acetic acid from the second effluent. The phosphoric acid in the residue from the first effluent is used to re-impregnate the catalyst after the second treatment. The residue from the second effluent is substantially free of phosphoric acid and is discarded. Generally similar results are obtained employing polymer gasoline in place of benzene in the first contacting.

Example V

Operation generally similar to that in Example II is carried out, using however an equal volume mixture of glacial acetic acid and phosphoric acid in place of the acetic acid. A large proportion of the basic nitrogen compounds is removed, while the phosphoric acid in the treating agent largely inhibits the removal of free phosphoric acid from the catalyst by the treating agent.

Example VI

Operation generally similar to that in Example II is carried out, using however acetone in place of acetic acid. All of the phosphoric acid, but only about 19% of the basic nitrogen compounds, are removed from the catalyst. A greater proportion of the tar and polymer than in Example III is removed from the catalyst. In a subsequent treatment of the catalyst with glacial acetic acid in the manner described in Example II, the bulk of the remaining basic nitrogen compounds are removed from the catalyst. Acetone is distilled from the first effluent. Subsequent operation is generally similar to that described in Example IV. Other lower aliphatic ketones can be similarly used.

Generally similar results to those described above are obtained using formic acid or propionic acid in place of, or in addition to, acetic acid. Generally similar results are also obtained employing fatty acid contacting agents containing water.

The invention claimed is:

1. Process for reactivating solid phosphoric acid catalyst which comprises: contacting solid phosphoric acid catalyst, which has been employed in the polymerization of gaseous olefins containing nitrogenous impurities, in a first treatment step at room temperature with a contacting agent selected from the group consisting of (a) a mixture of a fatty acid containing 1 to 3 carbon atoms per molecule and a hydrocarbon having 5 to 15 carbon atoms, each component of said mixture being present in at least 10 volume percent concentration, and (b) a lower aliphatic ketone containing up to 6 carbon atoms, whereby substantially all of the free phosphoric acid in the catalyst and a minor amount of the basic nitrogen compounds in the catalyst are removed, subsequently treating the catalyst in a second treatment step at room temperature with the said fatty acid alone and separating fatty acid from catalyst having reduced content of nitrogen compounds as a result of said contacting.

2. Process according to claim 1 wherein said acid is substantially anhydrous.

3. Process according to claim 1 wherein fatty acid is subsequently distilled from the treating agent and re-used to contact additional solid phosphoric acid catalyst.

4. Process according to claim 1 wherein said acid is acetic acid.

5. Process according to claim 3 wherein phosphoric acid recovered from the distillation residue is used to impregnate solid adsorbent to prepare additional solid phosphoric acid catalyst.

References Cited in the file of this patent

UNITED STATES PATENTS

| | | |
|---|---|---|
| 2,579,433 | Holm et al. | Dec. 18, 1951 |
| 2,658,933 | May et al. | Nov. 10, 1953 |
| 2,749,359 | Calkins et al. | June 5, 1956 |